(12) United States Patent
Otawa et al.

(10) Patent No.: US 7,033,692 B1
(45) Date of Patent: Apr. 25, 2006

(54) FUEL CELL SEPARATOR

(75) Inventors: Kazuhiko Otawa, Osaka (JP);
Tsunemori Yoshida, Sanda (JP);
Katsunori Sugita, Sanda (JP)

(73) Assignee: Nippon Pillar Packing Co., Ltd.,
Osaka (JP)

( * ) Notice: Subject to any disclaimer, the term of this patent is extended or adjusted under 35 U.S.C. 154(b) by 536 days.

(21) Appl. No.: 10/168,766

(22) PCT Filed: Oct. 23, 2000

(86) PCT No.: PCT/JP00/07362

§ 371 (c)(1),
(2), (4) Date: Jun. 19, 2002

(87) PCT Pub. No.: WO02/35630

PCT Pub. Date: May 2, 2002

(51) Int. Cl.
*H01M 2/00* (2006.01)
*H01M 2/02* (2006.01)

(52) U.S. Cl. .............................. 429/34; 429/35; 429/36

(58) Field of Classification Search .................. 429/34, 429/35, 36, 37, 38, 39
See application file for complete search history.

(56) References Cited

U.S. PATENT DOCUMENTS

2002/0004156 A1* 1/2002 Mizuno ........................ 429/34

FOREIGN PATENT DOCUMENTS

| JP | H4-305083 | 10/1992 |
| JP | H8-180892 | 7/1996 |
| JP | H11-204120 | 7/1999 |
| JP | H11-297338 | 10/1999 |
| JP | 2000-285931 | 10/2000 |

\* cited by examiner

*Primary Examiner*—Michael Barr
*Assistant Examiner*—Monique Wills
(74) *Attorney, Agent, or Firm*—Koda & Androlia

(57) ABSTRACT

According to the invention, in a separator molded member (4A) for a fuel cell which is produced by: loading a complex compound that is configured by bonding graphite powder by means of a thermosetting resin, into a mold (14); and forming ribs (11) for forming gas passages by the resin molding process, the surfaces of the ribs (11) are alkali-treated by, for example, etching by using an alkaline solution, and graphite particles (14) which are flat and soft are exposed from the top surfaces of the ribs (11) which function as a contact surface with an electrode in the separator molded member (4A), and resin defective portions (15) are formed between adjacent graphite particles (14), whereby the contact area with an electrode is enlarged, so that the performance and efficiency of the fuel cell can be improved by remarkable lowering of the contact resistance.

5 Claims, 10 Drawing Sheets

×100

×500

×100

×500

×100

×500

×100

×500

FUEL CELL SEPARATOR

TECHNICAL FIELD

The present invention relates to a fuel cell separator which is mainly used as a cell for an electric vehicle, and more particularly to a fuel cell separator of the solid polymer electrolyte type or the phosphoric acid type which is used for: sandwiching a gas diffusion electrode having a sandwich structure wherein an electrolyte membrane configured by an ion exchange membrane is interposed between an anode and a cathode from both the outer sides; and forming fuel gas passages, oxidant gas passages, and coolant water passages between the anode and the cathode, thereby constituting a unit cell that is a unit of the fuel cell.

BACKGROUND ART

In a fuel cell, a fuel gas containing hydrogen is supplied to an anode, and an oxidant gas containing oxygen is supplied to a cathode, so that, in the anode and the cathode, electrochemical reactions indicated by the formulae:

$$H_2 \rightarrow 2H^+ + 2e^- \quad (1)$$

$$(1/2)O_2 + 2H^+ + 2e^- \rightarrow H_2O \quad (2)$$

occur, and, in the whole of the cell, an electrochemical reaction indicated by the formula:

$$H_2 + (1/2)O_2 \rightarrow H_2O \quad (3)$$

proceeds. The chemical energy of the fuel is directly converted into an electrical energy, with the result that the cell can exert predetermined cell performance.

A fuel cell separator of the solid polymer electrolyte type or the phosphoric acid type in which such energy conversion is conducted is requested to be gas-impermeable, and also to be made of a material of high electrical conductivity in order to improve the energy conversion efficiency. Conventionally, it is known that, as a material meeting the requirements, an electrically conductive resin is used. An electrically conductive resin is a complex which is configured by bonding graphite (carbon) powder by means of a thermosetting resin such as phenol resin, or a so-called bondcarbon (resin-bonded carbon) compound. A technique is conventionally employed in which a fuel cell separator is produced by loading the bondcarbon compound into a mold, and resin-molding into a predetermined shape in which ribs for forming fuel gas passages, oxidant gas passages, or coolant water passages are formed integrally on at least one face of a separator molded member.

In such a fuel cell separator which is resin-molded into the predetermined shape by using a bondcarbon compound, when the thermosetting resin is softened by heating during the resin molding process, part of the thermosetting resin oozes to the surface layer to form a thin resin layer on the surface of the separator molded member. The thin resin layer is naturally formed also on the surfaces of the ribs for forming passages and functioning as a contact surface with an electrode in a product (separator).

The thin resin layer which is formed on the surface of the separator molded member in this way is an electrical insulating layer, and does not exhibit conductivity. As a whole of the separator, therefore, the conductivity is lowered, and the specific resistance is increased. Moreover, also the contact resistance with an electrode is increased by the presence of the thin resin layer which is formed on the top surfaces of the ribs. The contact resistance with an electrode which is increased by the formation of the thin resin layer is larger by one digit than the specific resistance of the whole separator which is similarly increased by the formation of the thin resin layer. The increase of the contact resistance more strongly affects the internal resistance of the fuel cell which is the sum of the specific resistance and the contact resistance. In order to improve the performance and efficiency of the fuel cell, therefore, it is requested to reduce the contact resistance of the top surfaces of the ribs with an electrode, as much as possible.

As means for satisfying such a request, conventionally, the following means have been proposed. For example, Japanese Patent Application Laying-Open No. 11-204120 discloses means for polishing or grinding away the surfaces of ribs to physically remove a thin resin layer, and Japanese Patent Application Laying-Open No. 11-297338 discloses means for immersing a separator in, for example, a strongly acidic solution into which one or two or more of hydrochloric acid, sulfuric acid, nitric acid, hydrofluoric acid, and the like are mixed, to acid-treat the surface, whereby the surface roughness of the surfaces of the ribs is adjusted to Ra=0.1 μm to 10 μm so as to reduce the contact resistance.

In the case of the former one of the means which have been conventionally proposed, i.e., the resin layer physically removing means based on polish or grinding removal of the surfaces of the ribs, it is technically very difficult to remove only the thin resin layer, and hence the contact resistance cannot be sufficiently lowered. This will be described in detail. As shown in a diagrammatic section view of FIG. 11, when the top surfaces of ribs 51 are polished or ground to remove a thin resin layer, also graphite particles 52 which contribute to the conductivity are removed away together to reduce the amount of graphite particles in the surfaces of the ribs 51. Moreover, a contact surface 51a with an electrode is formed by: recesses 53 which are traces of removed graphite particles; a resin portion 54; and exposed graphite particles 52. As a result, the graphite density of the contact surface 51a with an electrode is lowering, and the contact surface 51a with an electrode is formed as a rough face which is greatly uneven, to reduce the contact area with an electrode. Therefore, the contact resistance is not sufficiently lowered although the thin resin layer is removed away.

In the case of the latter means, i.e., the means for immersing a separator in an acidic solution to acid-treat the surface, the acidic solution erodes even the inside of graphite particles to form graphite oxide, and, when the graphite oxide is formed, free electrons join the reaction. Therefore, the conductivity inherent in graphite particles is impaired, so that the specific resistance of the whole separator is increased and the contact resistance with an electrode cannot be sufficiently lowered. This will be described in detail. As shown in a diagrammatic section view of FIG. 12, the thin resin layer on the top surfaces of the ribs 51 can be removed away by the erosion function of the acidic solution to expose the flat graphite particles 52 from the surface. In the case of acid-resistant phenol resin, however, the selective removal of the resin by the acidic solution does not advance, and both the graphite particles 52 which are exposed from the surfaces of the ribs 51 by the erosion function of the acidic solution, and the resin portions 54 between adjacent particles are removed away only by approximately equal amounts. The contact surface 51a with an electrode of low surface roughness is formed by the graphite particles 52 and the resin portions 54, and no gap is formed between adjacent exposed graphite particles 52, so that the areas between adjacent graphite particles 52 remain to be filled with the resin portions 54. Even when an electrode 55 is strongly pressed against the contact surface 51a by a fastening force for forming a stack configuration, therefore, the graphite particles 52 cannot be deformed. Depending on the status of the erosion by the acidic solution, flat faces 52a of the graphite particles 52 sometimes remain to be inclined with respect to the contact face of the electrode 55. Even when the thin resin layer can be removed away by the acid treatment, therefore, the contact area with the electrode 55 cannot be enlarged, and the adaptability is poor. Consequently, there is a problem in that, although the treatment requires a very sophisticated technique of adjusting the surface roughness to the above-mentioned specific range and much labor, the contact resistance with an electrode cannot be sufficiently lowered.

DISCLOSURE OF INVENTION

The present invention has been conducted in view of the above-mentioned circumstances of the conventional art. It is an object of the invention to provide a fuel cell separator in which a contact resistance can be remarkably lowered by enlargement of a contact area with an electrode and improvement of adaptability with a contact surface of an electrode, without unnecessarily removing graphite particles contributing to the conductivity and impairing the conductivity inherent in graphite particles.

The fuel cell separator according to the invention is a fuel cell separator which consists of a complex that is configured by bonding graphite powder by means of a thermosetting resin, and in which ribs for forming fuel gas passages, oxidant gas passages, or coolant water passages are formed on at least one face by a resin molding method, and characterized in that plural flattened graphite particles are exposed from top surfaces of the ribs for forming passages and functioning as a contact surface with an electrode, and a resin defective portion is formed between respective adjacent ones of the plural exposed flat graphite particles.

According to the invention having these constituent components, plural graphite particles which are flat and soft, and which contribute to the conductivity are exposed from the top surfaces of the ribs which function as a contact surface with an electrode, and resin defective portions are formed between adjacent exposed flat graphite particles. Therefore, graphite particles of the top surfaces of ribs which receive a pressing force when plural separators and electrodes are stacked are deformed in the face direction so as to fill the resin defective portions, so that the contact area with an electrode can be enlarged, and the adaptability between the contact face of an electrode and the top surfaces of the ribs (the contact surface with an electrode) can be improved, thereby enabling the contact area to be further enlarged. As compared with a conventional separator which is configured by removing a thin resin layer which is formed on the top surfaces of ribs in the process of molding the separator, by physical means of polishing or grinding, lowering of the graphite density of the contact surface due to reduction of the amount of graphite particles of the top surfaces of ribs does not occur, and the contact face with an electrode can be formed as a fine and smooth face which is substantially free from ruggedness. As compared with a conventional separator which is configured by removing a thin resin layer on the top surfaces of ribs, by an acid treatment, the contact area with an electrode can be made larger, the adaptability is excellent, and the conductivity inherent in graphite particles is not impaired. Therefore, not only the specific resistance of the whole separator, but also the contact resistance with an electrode which very strongly affects the internal resistance of the fuel cell can be remarkably lowered.

Furthermore, the improved adaptability with an electrode attains an effect that also the gas impermeability (sealing property) between the electrode surface and the contact surface can be improved.

In the fuel cell separator according to the invention, the composition ratio of the thermosetting resin which is one of the compositions of the complex, and which largely affects the fluidity, the moldability, and the strength may be set to a range of 10 to 40 wt. %, preferably, 13 to 30 wt. %, and the average particle diameter of the graphite powder which is the other composition of the complex, and which largely affects the contact resistance may be set to a range of 15 to 125 μm, preferably, 40 to 100 μm whereby the elongation and fluidity of the complex serving as a molding material can be enhanced to improve the moldability. Furthermore, the contact resistance with an electrode can be lowered to improve the performance and efficiency of the fuel cell, while ensuring strength sufficient for preventing the separator from suffering a damage such as a breakage due to vibrations or the like.

As the thermosetting resin which is useful in the invention, phenol resin which is excellent in wettability with respect to graphite powder may be most preferably used. Alternatively, any other resin such as polycarbodiimide resin, epoxy resin, furfuryl alcohol resin, urea resin, melamine resin, unsaturated polyester resin, or alkyd resin may be used as far as the resin causes a thermosetting reaction when the resin is heated, and is stable against the operating temperature of the fuel cell and components of the supplied gasses.

As the graphite powder which is useful in the invention, powder of graphite of any kind, including natural graphite, artificial graphite, carbon black, kish graphite, and expanded graphite may be used. In consideration of conditions such as the cost, the kind can be arbitrarily selected. In the case where expanded graphite is used, particularly, a layer structure is formed by expanding the volume of the graphite as a result of heating. When the molding pressure is applied, layers can twine together to be firmly bonded to one another. Therefore, expanded graphite is effective in a complex in which the ratio of a thermosetting resin is to be reduced.

BEST MODE FOR CARRYING OUT THE INVENTION

Figure 1:
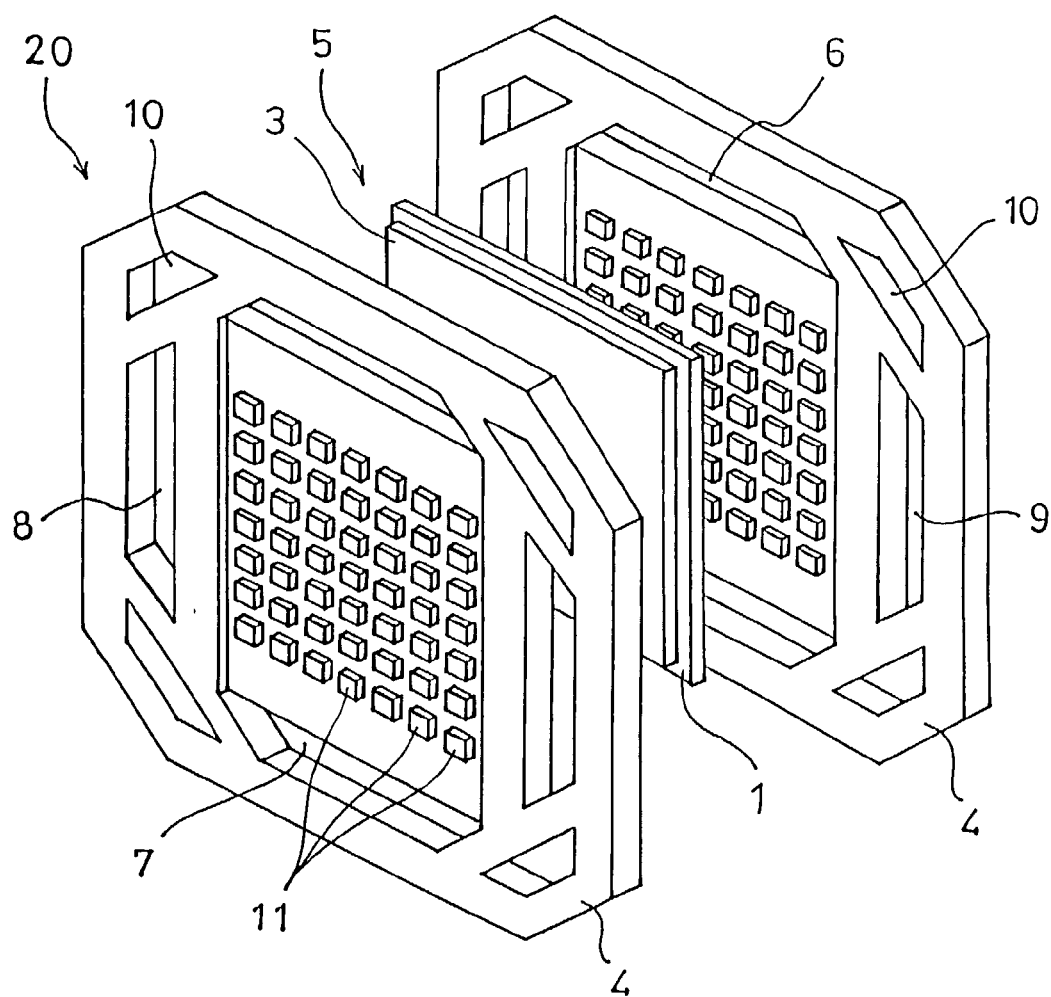
FIG. 1 is an exploded perspective view showing the configuration of a stack structure constituting a solid polymer electrolyte type fuel cell which has the separator of the invention.

Hereinafter, an embodiment will be described. FIG. 1 shows the configuration of a stack structure constituting a solid polymer electrolyte type fuel cell which has the separator of the invention.

The solid polymer electrolyte type fuel cell 20 has a stack structure wherein plural unit cells 5 each of which is configured by: an electrolyte membrane 1 that is an ion exchange membrane made of, for example, a fluororesin; an anode 2 and a cathode 3 that are formed by carbon cloth woven of carbon filaments, carbon paper, or carbon felt, and that sandwich the electrolyte membrane 1 from both the sides to constitute a gas diffusion electrode having a sandwich structure; and separators 4, 4 that sandwich the sandwich structure from both the sides are stacked, and collector plates that are not shown are respectively placed on both the ends.

Figure 2:
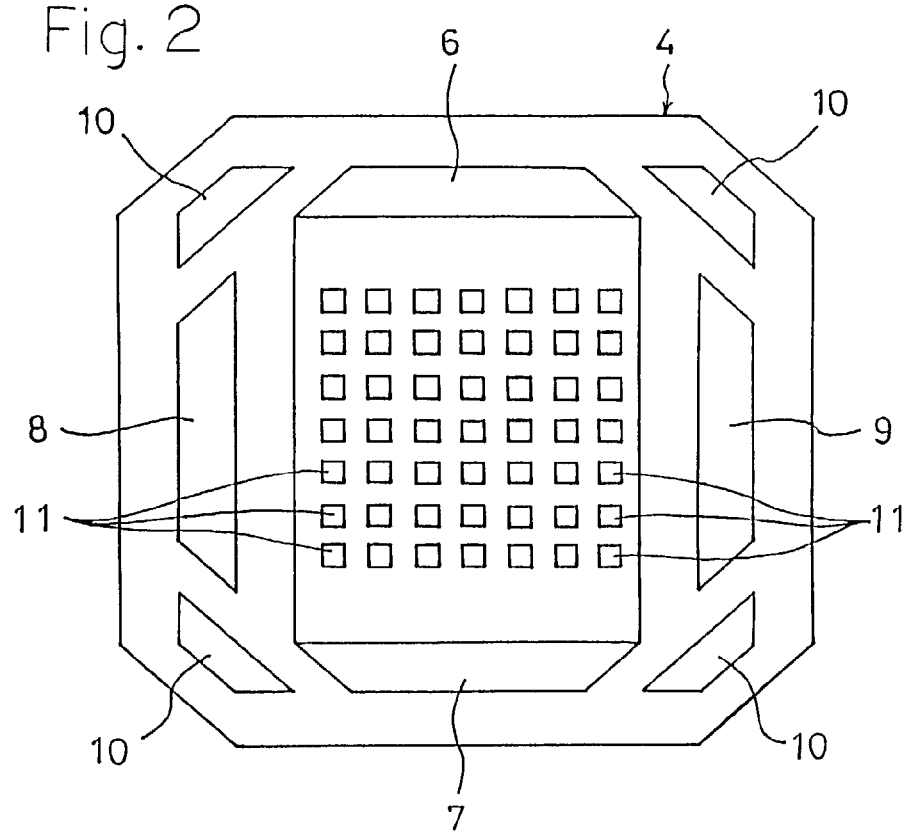
FIG. 2 is an external front view of the separator in the solid polymer electrolyte type fuel cell.

In each of the separators 4, as clearly shown in FIG. 2, fuel gas holes 6 and 7 containing hydrogen, oxidant gas holes 8 and 9 containing oxygen, and a coolant water hole 10 are formed in the peripheral area. When plural unit cells 5 are stacked, the holes 6, 7, 8, 9, and 10 of each separator 4 pass through the interior of the fuel cell 20 in the longitudinal direction to form a fuel gas supply manifold, a fuel gas discharge manifold, an oxidant gas supply manifold, an oxidant gas discharge manifold, and a coolant water passage, respectively.

Figure 3:
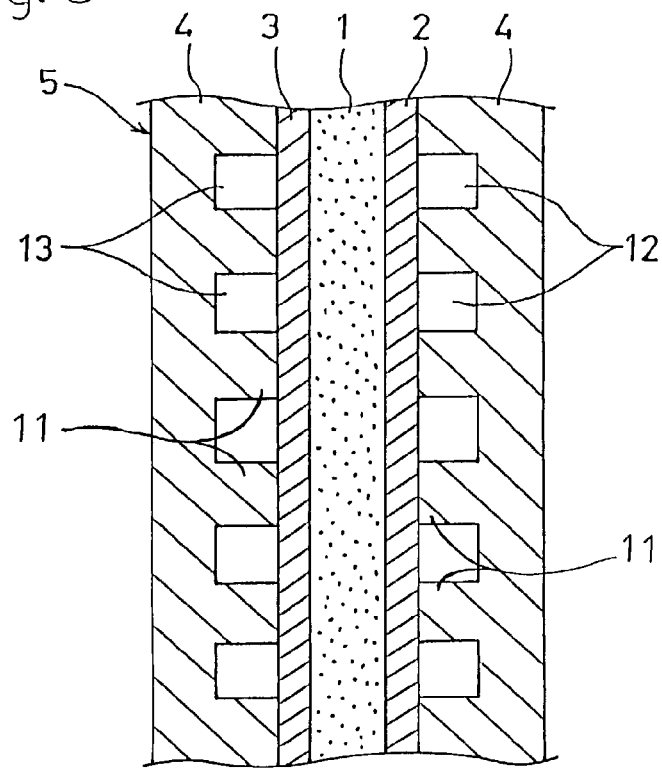
FIG. 3 is an enlarged section view of main portions and showing the configuration of a unit cell which is a unit constituting the solid polymer electrolyte type fuel cell.

Ribs 11 having a predetermined shape are integrally formed on the surfaces of the separators 4. As shown in FIG. 3, fuel gas passages 12 are formed between the ribs 11 and the surface of the anode 2, and oxidant gas passages 13 are formed between the ribs 11 and the surface of the cathode 3.

In the solid polymer electrolyte type fuel cell 20 configured as described above, the fuel gas which is supplied from an externally disposed fuel gas supplying device to the fuel cell 20, and which contains hydrogen is then supplied into the fuel gas passages 12 of each unit cell 5 via the fuel gas supply manifold to cause the electrochemical reaction indicated by formula (1) above, on the side of the anode 2 of the unit cell 5. After the reaction, the fuel gas is discharged to the outside from the fuel gas passages 12 of the unit cell 5 via the fuel gas discharge manifold. At the same time, the oxidant gas (air) which is supplied from an externally disposed oxidant gas supplying device to the fuel cell 20, and which contains oxygen is supplied into the oxidant gas passages 13 of each unit cell 5 via the oxidant gas supply manifold to cause the electrochemical reaction indicated by formula (2) above, on the side of the cathode 3 of the unit cell 5. After the reaction, the oxidant gas is discharged to the outside from the oxidant gas passages 13 of the unit cell 5 via the oxidant gas discharge manifold.

In accordance with the electrochemical reactions of formulae (1) and (2) above, in the whole of the fuel cell 20, the electrochemical reaction indicated by the formula (3) above proceeds, so that the chemical energy of the fuel is directly converted into an electrical energy, with the result that the cell can exert predetermined performance. Because of the characteristics of the electrolyte membrane 1, the fuel cell 20 is operated in a temperature range of about 80 to 100° C., and hence involves heat generation. During operation of the fuel cell 20, therefore, coolant water is supplied from an externally disposed coolant water supplying device to the fuel cell 20, and the coolant water is circulated through the coolant water passage, thereby preventing the temperature of the interior of the fuel cell 20 from being raised.

Figure 4A:
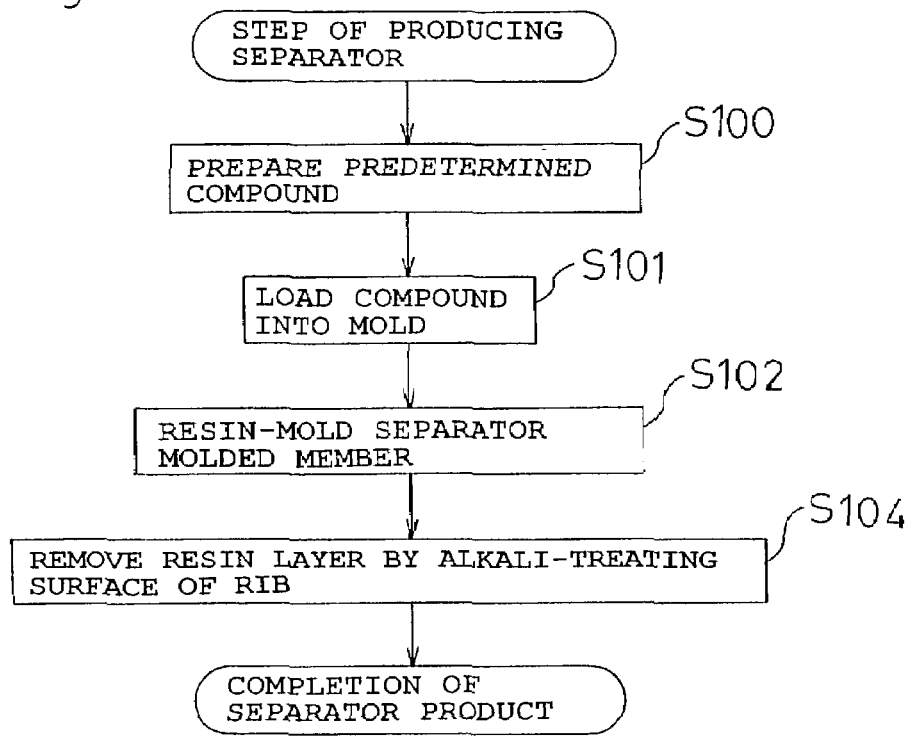
FIG. 4A is a chart illustrating steps of producing the separator of the invention.
Figure 4B:
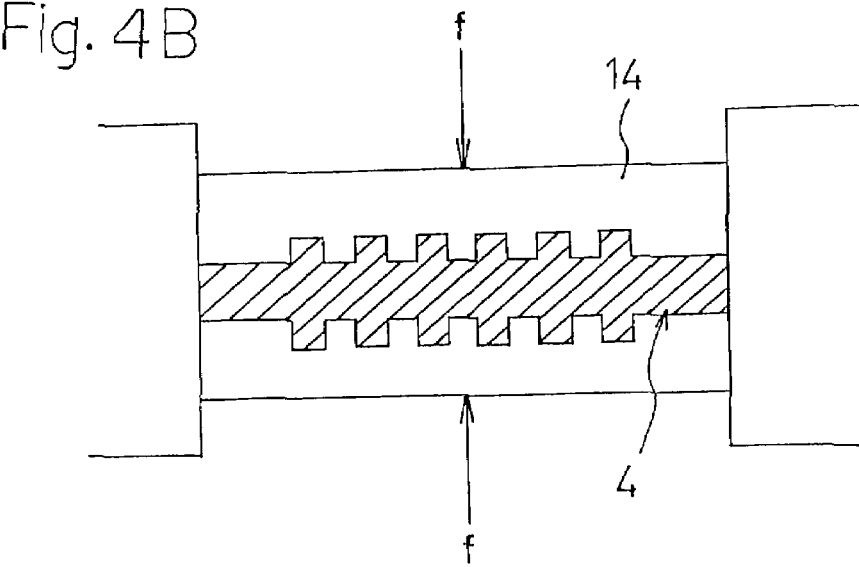
FIG. 4B is a view illustrating the manner of the production.

A method of producing the separator 4 in the solid polymer electrolyte type fuel cell 20 which is configured and operates as described above will be described with reference to FIGS. 4A and 4B. The separator 4 is molded by using a complex (bondcarbon) in which the composition ratios are set to 60 to 90 wt. %, preferably, 70 to 87 wt. % of graphite powder, and 10 to 40 wt. %, preferably, 13 to 30 wt. % of a thermosetting resin. The graphite powder and the thermosetting resin are uniformly mixed with each other and adjusted to produce a predetermined compound (step S100). The compound is loaded into a mold 14 having a predetermined molding shape including recesses for forming the ribs 11 (step S101). Under this state, the mold 14 is heated to 150 to 200° C. to elevate the temperature, and a pressing machine which is not shown is operated to apply a pressure in a range of 10 to 100 MPa, preferably, 20 to 50 MPa in the directions of the arrows f in FIG. 4B, whereby a separator molded member 4A of a predetermined shape having the ribs 11 is resin-molded in accordance with the shape of the mold 14 (step S102).

Figure 7:
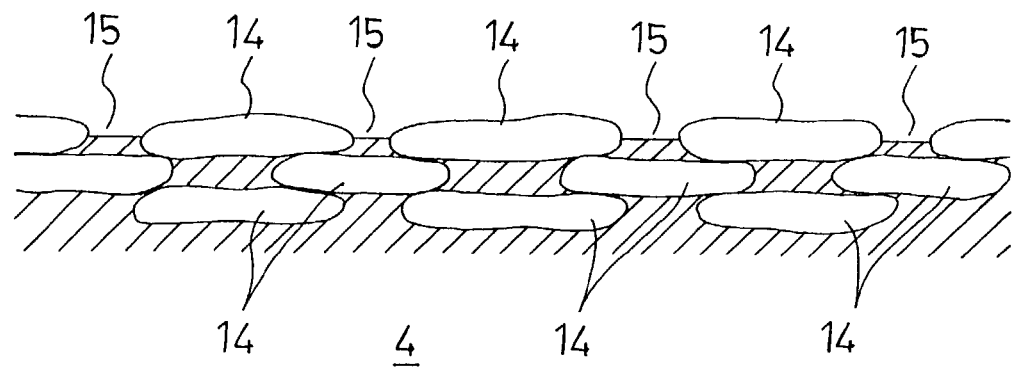
FIG. 7 is an enlarged section of main portions diagrammatically showing the surface condition of ribs of the separator of the invention after treatment.

Next, in the separator molded member 4A which has been resin-molded as described above, the surfaces of the ribs 11 which form the gas passages 12 and 13 and the coolant water passages when the separators are incorporated into a fuel cell are etched by, for example, an alkaline solution or alkali-treated to remove the surface resin layer (step S103), thereby completing the production of the separator 4 which is a final product, and in which plural flat graphite particles 14 are exposed from the top surfaces 11a of the ribs 11 that function as a contact surface with an electrode, and a resin defective portion (gap) 15 is formed between respective adjacent ones of the plural flat graphite particles 14 that are exposed from the top surfaces 11a of the ribs 11, as shown in FIG. 7.

In the thus produced separator 4, only the thin resin layer formed on the top surfaces of the ribs 11 can be efficiently removed away, and soft and flat graphite particles 14 can be exposed at a high density from the top surfaces 11a of the ribs 11 which function as a contact surface with an electrode, without reducing the amount of graphite particles contributing to the conductivity, and without allowing the treatment solution to erode the inside of graphite particles 14 to impair the conductivity inherent in graphite particles, or while maintaining the conductivity inherent in graphite particles 14 to a satisfactory level. The contact area with an electrode can be enlarged.

Figure 8:
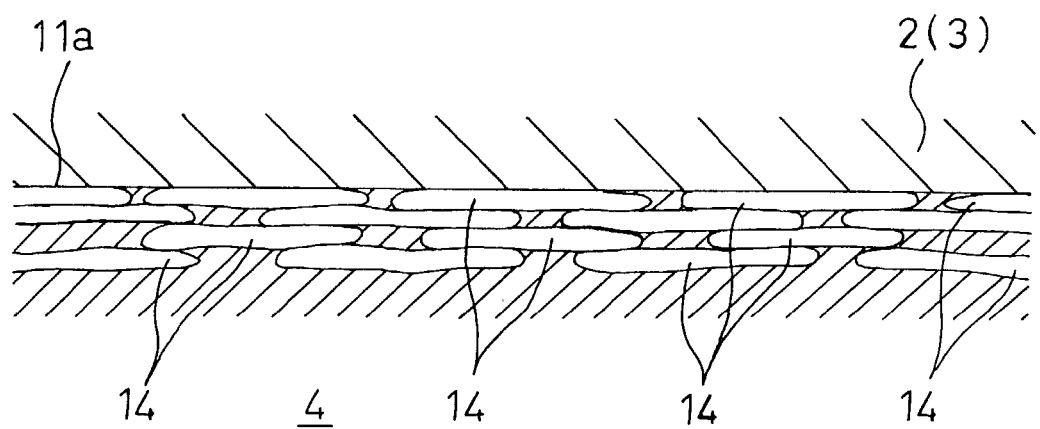
FIG. 8 is an enlarged section of main portions diagrammatically showing the surface condition of ribs when the separator of the invention and electrodes (an anode and a cathode) are stacked.

Since the contact face configured by the top surfaces 11a of the ribs 11 is excellent also in adaptability with an electrode, when plural separators 4 and electrodes (the anode 2 and the cathode 3) are stacked by a strong fastening force, flat graphite particles 14, 14 which are exposed from the top surfaces 11a of the ribs 11 receive the pressing force to be deformed in the face direction so as to fill the resin defective portions 15 as shown in FIG. 8, whereby the contact areas between the contact surface 11a and the electrode 2 and 3 can be further enlarged.

By the synergistic action of the above, the specific resistance of the whole separator 4 can be lowered while ensuring the excellent conductivity due to graphite particles, and the contact resistance with an electrode which very strongly affects the internal resistance of the fuel cell can be remarkably lowered. Furthermore, because of the improvement of the adaptability with an electrode, the gas impermeability (sealing property) between the electrode surface and the contact surface can be improved.

When the composition ratio of the thermosetting resin which largely affects the fluidity, the moldability, and the strength is set to a range of 10 to 40 wt. %, preferably, 13 to 30 wt. %, and the average particle diameter of the graphite powder which largely affects the contact resistance is set to a range of 15 to 125 µm, preferably, 40 to 100 µm, the elongation and fluidity of the complex serving as a molding material can be enhanced to improve the moldability, and the contact resistance with an electrode can be lowered to improve the performance and efficiency of the fuel cell, while ensuring strength sufficient for preventing the separator from suffering a damage such as a breakage due to vibrations or the like.

Hereinafter, the invention will be described in more detail by way of an example.

EXAMPLE 1

A test piece TP was shaped into 20 mm square so as to have 100 ribs in which depth×diameter is 0.5×1.25 (mm) by: loading a bondcarbon compound which was prepared at the composition ratios of 85 wt. % of natural graphite powder having an average particle diameter of 100 µm, and 15 wt. % of phenol resin, into a mold; and conducting a heat treatment for 2 minutes while applying a molding pressure of 15 MPa at a molding temperature of 165° C. The test piece was immersed for 20 seconds in an alkaline aqueous solution which was prepared by dissolving 20 g of potassium hydroxide (KOH) and 20 g of potassium ferricyanide $\{K_3Fe(CN)_6\}$ in 80 ml of water, and then boiling the solution. The test piece was then rinsed under running water, and dried.

COMPARATIVE EXAMPLE 1

In a test piece of 20 mm square which was produced by the same molding method as described above, surface portions of the ribs were removed away by a thickness of 0.1 mm by a grinder.

COMPARATIVE EXAMPLE 2

In a test piece of 20 mm square which was produced by the same molding method as described above, surface portions of the ribs were removed away by a thickness of 0.01 mm by hand-lapping using sand paper of #2000.

Figure 5A:
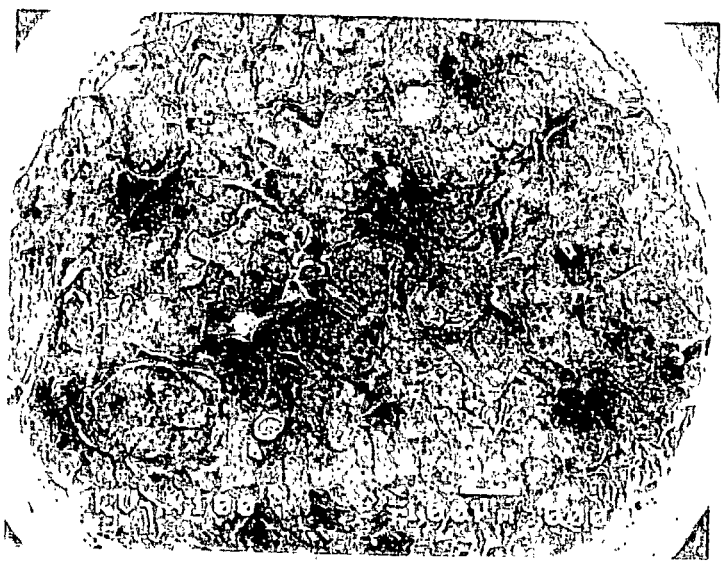
FIGS. 5A and 5B are photographs substituted for drawings showing the surface condition of ribs of the separator of the invention before treatment, by using an electron microscope at magnifications of 100 times and 500 times.
Figure 5B:
Figure 6A:
FIGS. 6A and 6B are photographs substituted for drawings showing the surface condition of ribs of the separator of the invention after treatment, by using an electron microscope at magnifications of 100 times and 500 times.
Figure 6B:

Contents of tests and results;

(1) In each of the test pieces which were commonly used in Example 1 and Comparative Examples 1 and 2, the surface condition of the ribs before the surface treatment was observed with an electron microscope at magnifications of 100 times and 500 times. The surface condition is in the condition shown in the photographs substituted for drawings of FIGS. 5A and 5B. In the test piece in the condition, the surfaces of ribs were etched by the alkaline solution as in Example 1, and the surface condition was then observed with an electron microscope at magnifications of 100 times and 500 times. As a result, the surface condition was changed to that shown in the photographs substituted for drawings of FIGS. 6A and 6B. In the case of Example 1, namely, only the thin resin layer which is formed on the surfaces of the ribs immediately after the resin molding process is removed away, plural graphite particles which are flat and soft are surely exposed from the surfaces, and gaps which are resin defective portions are formed between graphite particles.

Figure 9A:
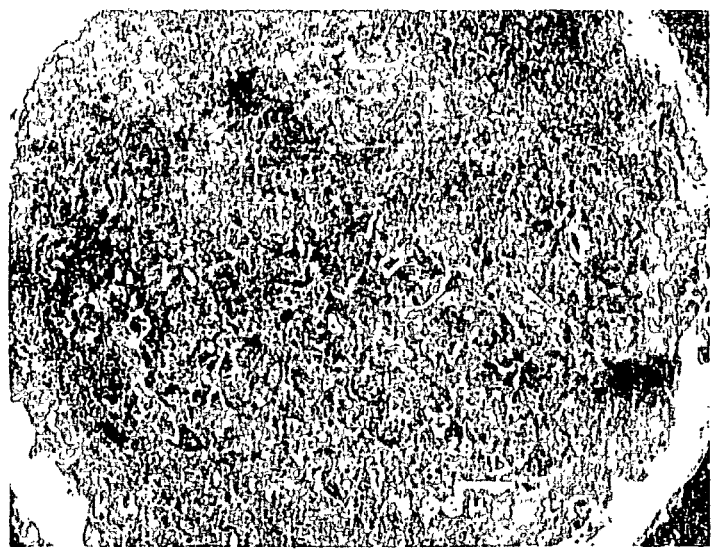
FIGS. 9A and 9B are photographs substituted for drawings showing the surface condition of ribs in Comparative Example 1 after treatment, by using an electron microscope at magnifications of 100 times and 500 times.
Figure 9B:
Figure 10A:
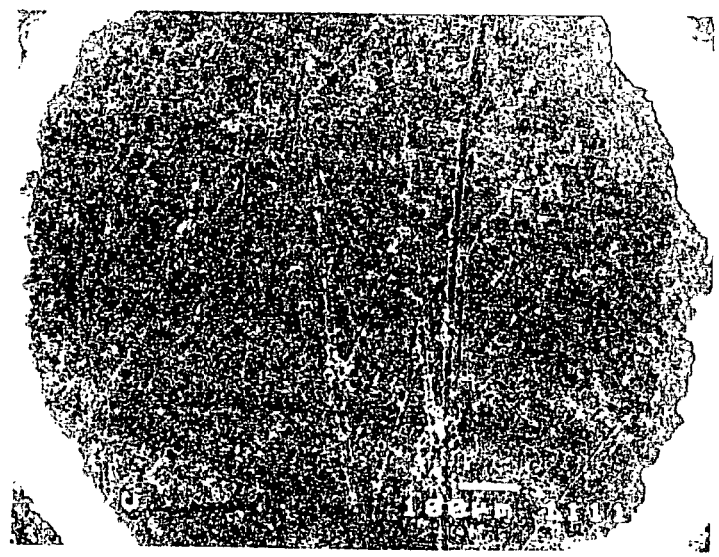
FIGS. 10A and 10B are photographs substituted for drawings showing the surface condition of ribs in Comparative Example 2 after treatment, by using an electron microscope at magnifications of 100 times and 500 times.
Figure 10B:
Figure 11:
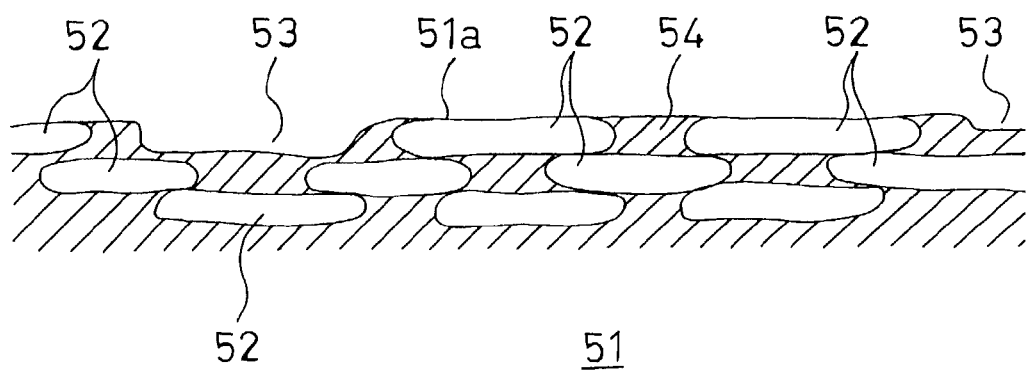
FIG. 11 is an enlarged section view of main portions diagrammatically showing the surface condition of ribs of a conventional separator in which the top surfaces of ribs are polished or ground away.
Figure 12:
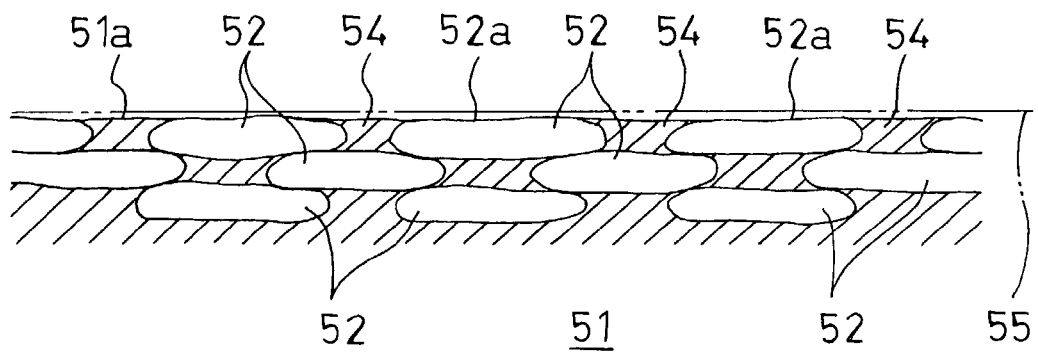
FIG. 12 is an enlarged section view of main portions diagrammatically showing the surface condition of ribs of a conventional separator in which the top surface of ribs are acid-treated.

By contrast, the surface condition after the top surfaces of ribs were ground away as in Comparative Example 1 was observed with an electron microscope at magnifications of 100 times and 500 times. The surface condition is in the condition shown in the photographs substituted for drawings of FIGS. 9A and 9B. The surface condition after the top surfaces of ribs were polished away as in Comparative Example 2 was observed with an electron microscope at magnifications of 100 times and 500 times. The surface condition is in the condition shown in the photographs substituted for drawings of FIGS. 10A and 10B. In both Comparative Examples 1 and 2, it was confirmed that, as shown in FIG. 11, part of graphite particles which contribute to the conductivity are shaved away together to reduce the amount of graphite particles in the surfaces of ribs, the surface is formed as a rough face which is greatly uneven, the resin portion remains to embedded between graphite particles so that graphite particles cannot be deformed, and hence no enlargement of the contact area with an electrode is attained.

Figure 13:
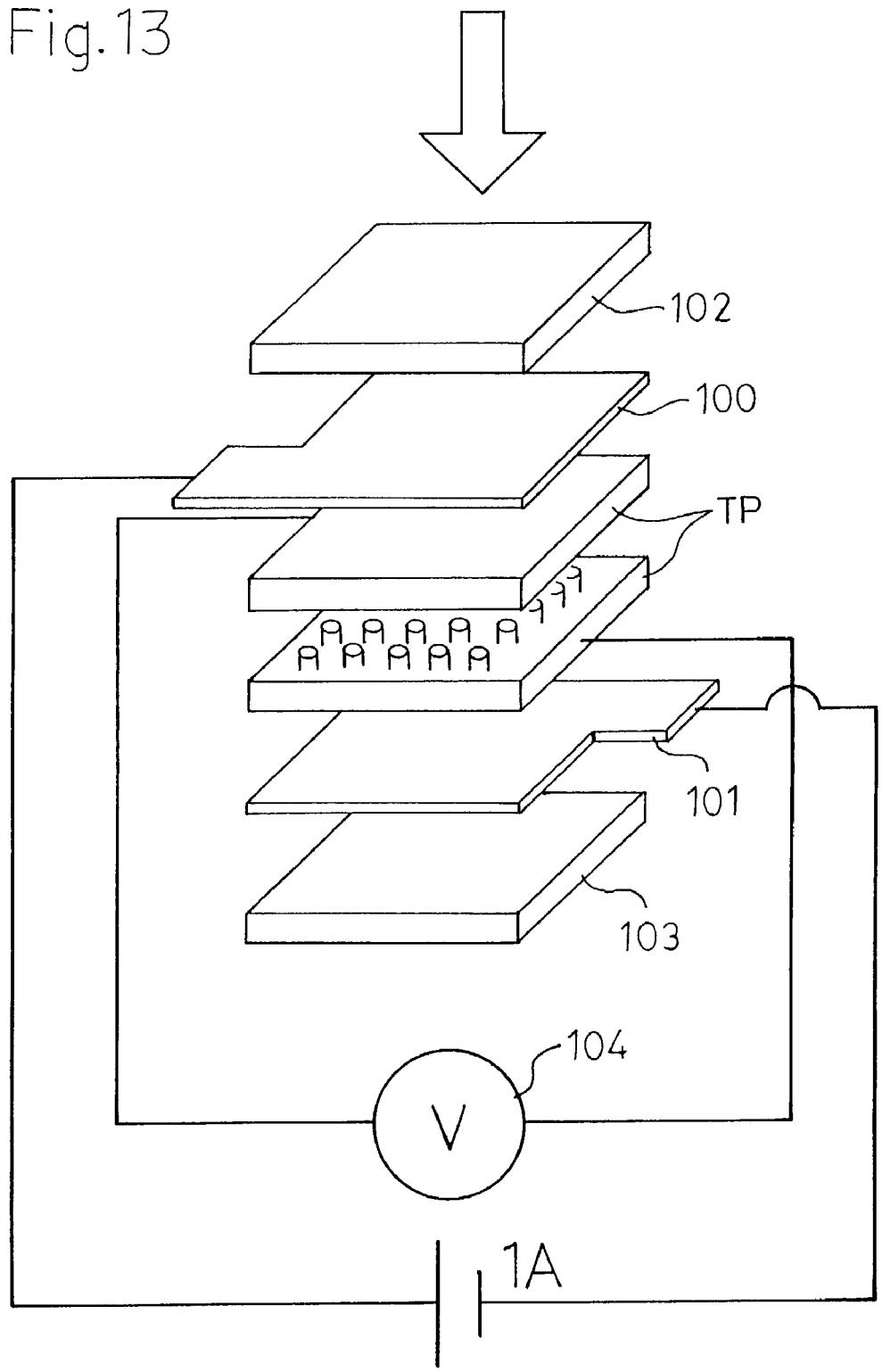
FIG. 13 is a view illustrating a manner of measuring a contact resistance.

(2) In each of the test pieces after surface treatment of Example 1 and Comparative Examples 1 and 2, and a conventional example in which a thin resin layer is removed away by acid-treating the surfaces of ribs, the contact resistance was measured. In the measurement of the contact resistance, as shown in FIG. 13, a current of 1 A was flown between a pair of electrodes 100 and 101 which were placed on the front and rear faces of the test piece TP, the test piece TP and the pair of electrodes 100 and 101 were sandwiched between rubber sheets 102 and 103, a surface pressure of 4 MPa at the maximum was applied, and a voltage applied to the test piece TP was measured by a voltmeter 104, thereby measuring the contact resistance. Then, results listed in Table 1 below were obtained.

TABLE 1

| Sample | Contact resistance (mΩ · cm$^2$) |
|---|---|
| Example 1 | 1 |
| Comparative Example 1 | 8 |

TABLE 1-continued

| Sample | Contact resistance (mΩ · cm$^2$) |
|---|---|
| Comparative Example 2 | 8 |
| Conventional Example | 10 |

Discussion of Test Results:

As apparent also from the photographs substituted for drawings of FIGS. 6A, 6B, 9A, 9B, 10A, and 10B, it will be seen that, in the case of Example 1 corresponding to the invention, the contact area with an electrode is enlarged, the adaptability with an electrode is excellent, and, in the stacked state, resin defective portions between adjacent particles are filled as a result of the deformation of graphite particles exposed from the surface to further enlarge the contact area, and, as a result, the contact resistance of the contact surface with an electrode is very smaller than that in Comparative Examples 1 and 2 in which other physical removing means is used, and the Conventional Example in which the acid treatment is used, as shown also in Table 1.

INDUSTRIAL APPLICABILITY

As described above, the invention is a technique wherein, in a fuel cell separator in which a complex that is configured by bonding graphite powder by means of a thermosetting resin is used and ribs for forming gas passages are formed by a resin molding method, flattened graphite particles are exposed from the surfaces of ribs which function as a contact surface with an electrode, and resin defective portions are formed between the graphite particles, thereby ensuring a large contact area to remarkably lower the contact resistance of a contact surface with an electrode which most strongly affects improvement of the performance and efficiency of the fuel cell.

What is claimed is:

1. A fuel cell separator which consists of a complex that is configured by bonding graphite powder by means of a thermosetting resin, and in which ribs for forming fuel gas passages and oxidant gas passages on a surface of said separator, and coolant water passages and fuel gas and oxidant gas manifolds in a peripheral area of said separators are formed by a resin molding method, wherein
   said ribs are formed in a shape and pattern such that said fuel gas passages and said oxidant gas passages extend both horizontally and vertically,
   plural flattened graphite particles are exposed from top surfaces of said ribs for forming passages and functioning as a contact surface with an electrode, and
   a resin defective portion is formed between respective adjacent ones of said plural exposed flat graphite particles.

2. A fuel cell separator according to claim 1, wherein said complex is set to have composition ratios of 60 to 90 wt % of graphite powder, and 10 to 40 wt. % of a thermosetting resin.

3. A fuel cell separator according to claim 1, wherein an average particle diameter of said graphite powder in said complex is set to be 300 μm or smaller.

4. A fuel cell separator according to claim 2, wherein an average particle diameter of said graphite powder in said complex is set to be 300 μm or smaller.

5. A fuel cell separator according to claim 1, wherein said pattern of said ribs is a waffle pattern.

* * * * *